June 4, 1940.　　　　F. C. BEST　　　　2,203,291
MOTOR VEHICLE
Filed Oct. 20, 1937
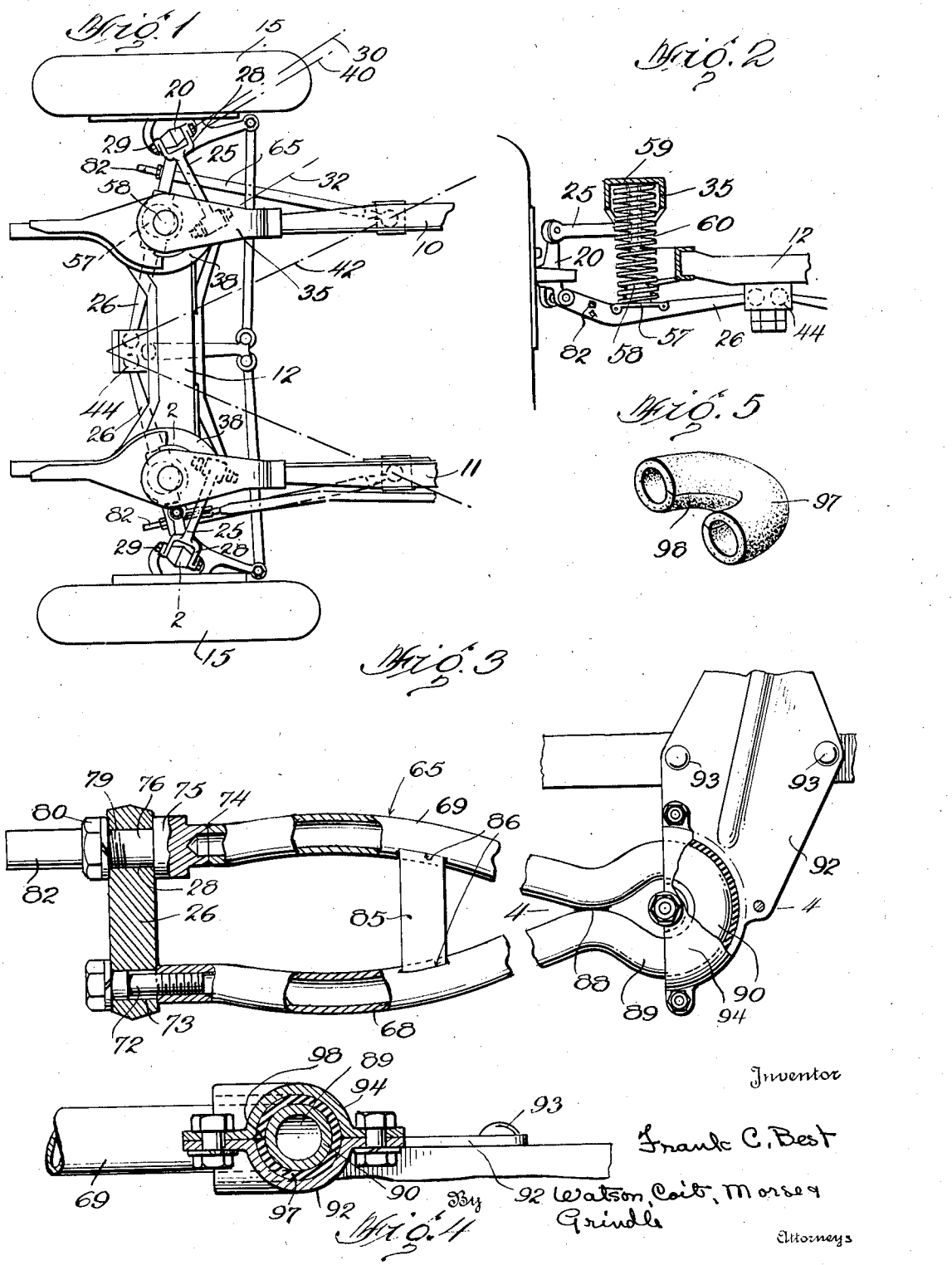

Patented June 4, 1940

2,203,291

UNITED STATES PATENT OFFICE 2,203,291

MOTOR VEHICLE

Frank C. Best, Detroit, Mich., assignor to Packard Motor Car Company, Detroit, Mich., a corporation of Michigan Application October 20, 1937, Serial No. 170,127

6 Claims. (Cl. 267—66)

This invention relates to improvements in motor vehicles and more particularly to vehicles of the type in which the road wheels are independently sprung from the vehicle frame. It is the principle object of the invention to reduce the weight and cost of the suspension to a minimum and at the same time to provide a structure which is sufficiently sturdy for operation under the most severe conditions and when employed in heavy vehicles.

More specifically, it is an object of the invention to provide in an independent wheel suspension employing parallel links or the like a torque arm extending generally longitudinally of the vehicle frame, this torque arm serving to connect one of the links with the frame in such manner as to resist braking torque and longitudinal shock. The arm is of simplified construction, being preferably formed principally from straight tubular stock which is deformed to offer maximum resistance to the stresses to which it is subjected, the construction being such as to facilitate connection of the arm to the link and the frame.

A further object of the invention is to provide a bracket for engagement by the conventional lifting jack, which bracket is readily accessible and is preferably integral with the torque arm.

Further objects and features of the invention will be apparent from the following description taken in connection with the accompanying drawing, in which Figure 1 is a plan view of a portion of a motor vehicle frame illustrating the application thereto of one form of the present invention;

Figure 2 is a partial transverse sectional view taken substantially on the line 2—2 of Figure 1;

Figure 3 is a side elevation of one of the torque arms shown in Figure 1, showing the method of connection of the torque arm to the frame and to the associated wheel supporting link;

Figure 4 is a sectional view taken substantially on the line 4—4 of Figure 3; and Figure 5 is a perspective view of the rubber element shown in Figures 3 and 4 and the connection of the torque arm to the frame.

In describing the invention reference will be made to the drawing illustrating one form of the invention only in the application thereof to the front steerable road wheels of a vehicle. It will nevertheless be understood that certain features of the invention are equally applicable to the rear road wheels and to road wheels which are not steerable. It will furthermore be appreciated that while the various elements disclosed in the drawing are described hereinafter by specific language in order to facilitate an understanding of the principles of the invention, no limitation of the scope of the invention is thereby intended, various alterations of these structural details being contemplated.

Referring first to Figure 1 of the drawing, it will be observed that the vehicle frame is illustrated as including side frame members 10 and 11, which may be of the usual channel or box type, and a cross frame member 12 extending between and rigidly secured to the two side frame members 10 and 11 adjacent the forward end of the latter. So far as the wheel suspension is concerned, the construction is preferably identical at the two sides of the vehicle, and it will therefore suffice in the following description to refer to those elements of the suspension disposed at one side only of the central longitudinal plane of the vehicle, the same reference characters being used in connection with corresponding elements associated with the two road wheels.

Thus each road wheel 15 is mounted in the conventional manner for swinging steering movement on a knuckle carrying member 20. This member is formed to provide upstanding and downwardly directed arms which constitute with the member 20 an integral unit. Since the precise shape of this member is not material, these integrally formed arms need not be separately designated, but in the drawing they are shown as pivotally connected respectively to upper and lower wheel supporting links 25 and 26 which are in turn pivotally connected at their inner ends to the vehicle frame. Thus the outer end of the wheel supporting link 25 may be formed to provide a yoke-shaped portion 28 embracing the upper end of the knuckle carrying member 20, the bolt 29 passing through the link 25 and the member 20 to connect the link and the member for relative movement about a pivotal axis 30. The inner end of the link 25 is similarly supported for pivotal movement with respect to the frame about an axis 32, the axes 30 and 32 being parallel.

The pivotal support for the inner end of the link 25 is mounted between the side frame member 10 or 11 and the frame bracket 35 and is rigidly secured to both, the bracket 35 being secured to the side frame member and forming in effect a continuation thereof, the side frame member being deflected or curved inwardly as at 38 adjacent the road wheel.

The lower wheel supporting link 26 is similarly pivotally connected to the knuckle carrying member 20 and to the vehicle frame for swinging movement with respect to both about axes indicated at 40 and 42 respectively, the pivotal connection at the inner end of the wheel supporting link 26 to the frame including a bracket 44 which is secured to and dependent from the cross frame member 12. In the preferred form of the present invention the lower link is considerably longer than the upper link, and is further directly associated with the vehicle springs so as to sustain the major portion of the vehicle load.

Intermediate the ends thereof the link 26 may be provided with a spring seat 57 having an upstanding boss 58 on the upper face thereof, the latter forming a guide for a coil spring 60 which is interposed under compression between the link 26 and the bracket 35, the bracket 35 being provided with a downwardly directed annular flange 59 forming a guide to receive the upper end of the spring 60. Spring seat 57 may be formed of flat metal stock and may be secured to the link in any convenient manner, for instance by welding, the laterally directed portions of the seat being formed to fit about the upper surface of the link as shown in Figure 2.

In order to adequately resist braking torque and other stresses in the wheel suspension, a torque arm 65 is provided, this torque arm extending generally longitudinally of the vehicle frame and having an articulated connection at the rear end thereof with the vehicle frame, and being connected, preferably rigidly, at its forward end with the lower wheel supporting link 26. The details of construction of this torque arm and the method of connecting the torque arm to the link and the frame constitute the essential features of novelty of the instant invention, it being understood that the use of the torque arm disclosed herein in association with vehicle suspensions of other types varying considerably in structure and function from that illustrated herein is contemplated.

The main portion of the torque arm is formed from an elongated bar, preferably of uniform tubular cross-section, this bar being bent at approximately the mid-portion thereof to provide arms 68 and 69 extending generally in the same direction, these arms being illustrated as defining a common vertical plane when the torque arm is assembled. At its forward end the arm 68 is threaded internally to receive a bolt 72, the latter extending through an aperture 73 in the lower arm link 26. Secured to the forward end of the arm 69, for example by welding as indicated at 74, is an element 75 which is provided with a reduced portion 76 extending through an aperture 78 in the lower link 26, this reduced portion being threaded as shown at 79 for the reception of a nut 80. The element 75 is preferably extended forwardly of the link 26 to provide a bracket 82 for engagement by the usual vehicle lifting jack. It will be observed that by means of the construction just described the torque arm may be rigidly secured to the lower link 26.

A brace member 85 extends between and is secured to the arms 68 and 69 respectively of the torque arm, preferably by welding as indicated at 86. The arms 68 and 69 are further welded together adjacent the rearward end of the torque arm as shown at 88.

The bending of the tubular stock which forms the major portion of the torque arm is preferably so effected as to form an eye 89 at the rearward end thereof, this eye being of generally annular shape. The rearward half 90 of the eye 89 is disposed within a supporting member consisting of a bracket 92, bolted as at 93 to the side frame member 11, the lower end of this bracket having secured thereto a cooperating cap 94 which is bolted to the bracket as indicated at 95. The cap and the bracket are shaped to afford a generally annular recess receiving the part 90 of the eye 89. A bushing 97 of rubber or other deformable material which is of generally annular shape and circular in cross-section and which is split as indicated at 98, surrounds the part 90 of the eye 89 and thus forms a sheath between this part and the bracket 92 and cap 94. If desired this rubber bushing 97 may be vulcanized or otherwise surface bonded to the adjacent contacting elements so as to ensure that when the torque arm is moved relatively to the bracket 92, the rubber will be distorted and no surface friction will occur.

It will be appreciated that the torque arm 65 may be inexpensively constructed and assembled and yet offers maximum resistance to stresses applied thereto by the wheel supporting link 26. As the link rises and falls, in response to corresponding rising and falling movement of the associated road wheel, the torque arm 65 will be permitted to swing slightly with respect to the frame with consequent deformation of the rubber bushing 97 which serves not only as a bearing requiring no lubrication but functions to cushion shocks and damp vibrations originating in the wheel suspension system.

It will be appreciated that in the wheel suspension illustrated herein, practically the entire stress applied to the suspension by the vehicle load and on braking of the vehicle is carried through the lower link 26 and the torque arm 65 to the frame, with the result that the strain on the bearings normally resulting from application of the brakes is greatly reduced. By reason of the special construction of the torque arm the unsprung weight of the wheel suspension system is relatively small and yet the necessary strength is secured. While the invention contemplates the use of a torque arm of this character to the upper link of a wheel suspension system, this is not essential in the type of wheel suspension shown herein, since the upper links function primarily to guide the road wheels in their rising and falling movements and are not subjected to severe stresses. Consequently, conventional construction may be employed in the upper links without introduction of excessive weight.

Having thus described the invention, what is claimed as new and desired to be secured by Letters Patent is:

1. In a motor vehicle, the combination with a vehicle frame, of a road wheel, means including a laterally extending link connecting said wheel to said frame for relative rising and falling movement, a torque arm connected to said frame and said link, the major portion of said torque arm being formed of an elongated bar bent upon itself to form arms extending in the same general direction, and means associated with the free ends of said arms for securing the latter to said link, said last named means including a bolt extending through said link and having threaded connection with the free end of one of said arms.

2. In a motor vehicle, the combination with a vehicle frame, of a road wheel, means including a laterally extending link connecting said wheel to said frame for relative rising and falling movement, a torque arm connected to said frame and said link, the major portion of said torque arm being formed of an elongated bar bent upon itself to form arms extending in the same general direction, and means associated with the free ends of said arms for securing the latter to said link, said last named means including an element welded to one of said arms and extending through said link, and means having threaded connection with said element.

3. In a motor vehicle, the combination with a vehicle frame, of a road wheel, means including a laterally extending link connecting said wheel to said frame for relative rising and falling movement, and a torque arm connected to said frame and said link, said torque arm having an integral extension affording a bracket for engagement by a vehicle lifting jack.

4. In a motor vehicle, the combination with a vehicle frame, of a road wheel, means including a laterally extending link connecting said wheel to said frame for relative rising and falling movement, and a torque arm connected to said frame and said link, said torque arm having a portion thereof extended through and beyond said link for engagement by a vehicle lifting jack.

5. In a motor vehicle, the combination with a vehicle frame, of a road wheel, means including a laterally extending link connecting said wheel to said frame for relative rising and falling movement, a torque arm connected to said frame and said link, the major portion of said torque arm being formed of an elongated bar bent upon itself to form arms extending in the same general direction and to form a generally annular eye at the point of bend, a bracket secured to said frame and engaging said eye to support said arm for pivotal movement about the axis of said eye, and means including rubber interposed between said bracket and eye.

6. In a motor vehicle, the combination with a vehicle frame, of a road wheel, means including a laterally extending link connecting said wheel to said frame for relative rising and falling movement, a torque arm connected to said frame and said link, the major portion of said torque arm being formed of an elongated bar bent upon itself to form arms extending in the same general direction and to form a generally annular eye at the point of bend, a bracket secured to said frame and engaging said eye to support said arm for pivotal movement about the axis of said eye, means including rubber interposed between said bracket and eye and surface bonded to both, and means associated with the free ends of said arms for attachment to said link.

FRANK C. BEST.